United States Patent [19]

Konishi

[11] 3,916,315

[45] Oct. 28, 1975

[54] PLANAR FREQUENCY CONVERTING DEVICE MOUNTED IN A WAVEGUIDE

[75] Inventor: Yoshihiro Konishi, Sagamihara, Japan

[73] Assignee: Nippon Hoso Kyokai, Tokyo, Japan

[22] Filed: June 15, 1973

[21] Appl. No.: 370,232

[30] Foreign Application Priority Data

June 22, 1972 Japan .............................. 47-62721

Oct. 25, 1972 Japan .............................. 47-106204

[52] U.S. Cl. ............... 325/445; 325/437; 333/84 M

[51] Int. Cl.$^{2}$ .......................................... H04B 1/26

[58] Field of Search ........... 325/430, 437, 439, 442, 325/445, 446, 448, 451; 331/107 G, 115; 333/84 M, 95 S

[56] References Cited

UNITED STATES PATENTS

| | | | |
|---|---|---|---|
| 3,560,887 | 2/1971 | Napoli et al. | 325/445 |
| 3,571,722 | 3/1971 | Vendelin | 325/445 |
| 3,621,306 | 11/1971 | Schickle | 331/107 G |
| 3,639,857 | 2/1972 | Okoshi | 333/84 M |
| 3,671,868 | 6/1972 | Sanders | 325/445 |
| 3,753,167 | 8/1973 | Cohn | 333/84 M |
| 3,778,717 | 12/1973 | Okoshi | 331/107 G |

*Primary Examiner*—George H. Libman

*Attorney, Agent, or Firm*—Stevens, Davis, Miller & Mosher

[57] ABSTRACT

A microwave frequency converting device to be used in a microwave waveguide comprising a conductor plate on which all the necessary circuit elements are provided by slot shaped conductor pattern.

14 Claims, 23 Drawing Figures

PLANAR FREQUENCY CONVERTING DEVICE MOUNTED IN A WAVEGUIDE

BACKGROUND OF THE INVENTION

1. Field of the Invention

The present invention relates to a frequency converting device to be used in a microwave waveguide.

2. Description of the Prior Art

A conventional frequency converting device or a frequency converter consists of various circuit elements, such as bandpass filters, local oscillator, mixer, low-pass filter and associated terminals.

In a known construction, a solid oscillator mounted on a waveguide has usually been used for producing a local oscillation signal. For the bandpass filter a waveguide type filter has been used. Usually the mixer is constructed in waveguide type or is provided by using printed circuit technique. Speaking in general, such elements have been manufactured independently and assembled to form a frequency converting device. Such a conventional device is usually bulky and is complicated in the construction which makes the device expensive.

SUMMARY OF THE INVENTION

An object of the present invention is to realize a microwave frequency converting device having a very simple construction and very high frequency stability and hence having high characteristics by using slot circuits provided on a conductor plate or on a conductive film applied on an insulating base of which conductor plate or the like is inserted in the waveguide tube.

The frequency converting device according to the present invention is characterized in that it comprises a conductor plate or a conductor film applied on an insulating base provided at symmetrical plane of a waveguide wherein the wave mode is transmitted in even mode in the cross-section of the waveguide and propagates along with said symmetrical plane, and that necessary circuit elements such as various filters, a mixer and an oscillator are provided on the conductor plate or film by forming slot shaped conductor patterns, and furthermore a non-linear element and an oscillator element are provided in space of on said conductor plate or conductor film.

In order to better understand the present invention, several embodiments thereof will be explained with reference to the accompanied drawings.

BRIEF DESCRIPTION OF THE DRAWINGS

FIGS. 2 *b* and *c* are more detailed explanatory views of the base plate;

FIGS. 2 *d* and *e* are end views of the frequency converting device;

FIGS. 2 *f* and *g* are top views for explaining said frequency converting device;

FIG. 2 *h* is an enlarged view of the conductor plate especially for the provision of connection with a current supplying source;

DESCRIPTION OF THE PREFERRED EMBODIMENT

Before explaining the device according to the present invention in detail some construction of a known frequency converter device will be explained.

Figure 1:
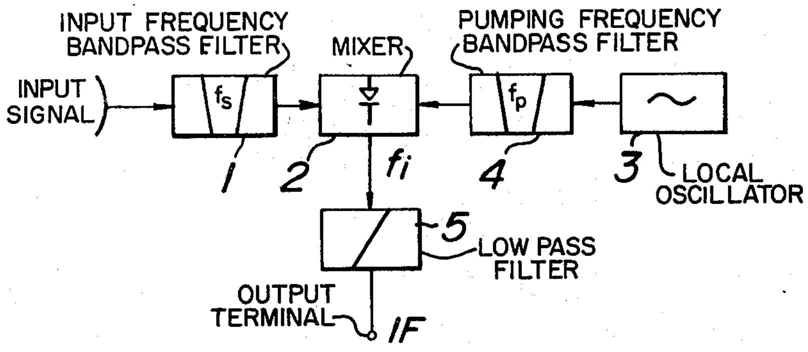
PRIOR ART FIG 1
FIG. 1 shows a block diagram for illustrating a schematic configuration of a conventional microwave frequency converting device.
Figure 2A:
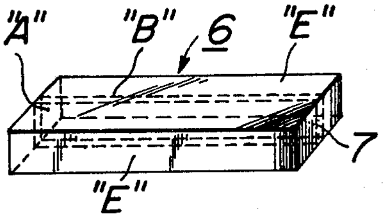
FIG. 2 *a* is a simplified diagram for explaining the insertion of a base plate in a waveguide for forming a frequency converting device according to the present invention.
Figure 2E:
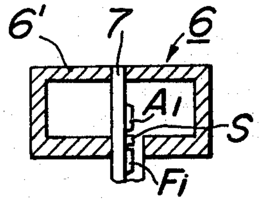
Figure 2B:
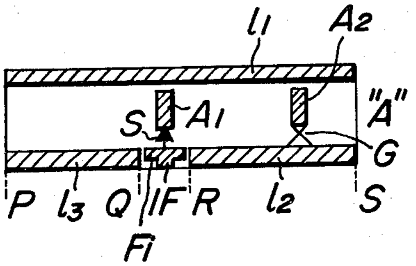
Figure 2F:
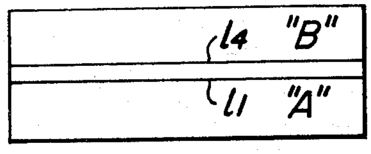
Figure 2C:
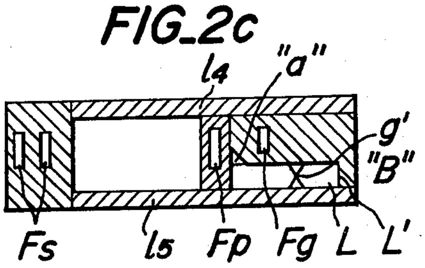
Figure 2G:
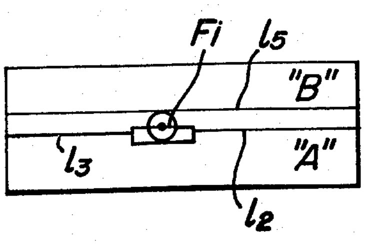
Figure 2H:
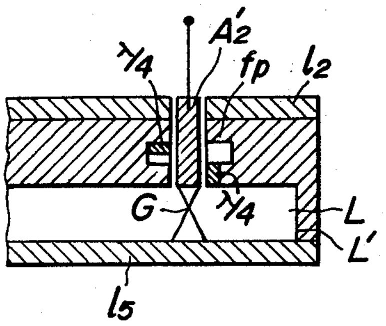
Figure 2D:
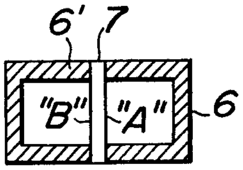
Figure 3A:
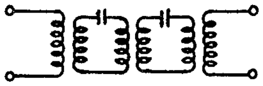
FIGS. 3 *a*, *b*, *c*, *d*, *e* and *f* are equivalent circuit diagrams for the various portions of the circuit element.
Figure 3B:
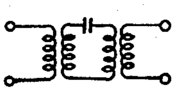
Figure 3C:
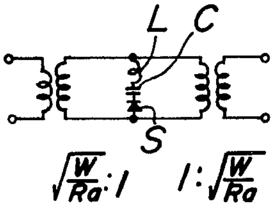
Figure 3D:
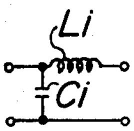
Figure 3E:
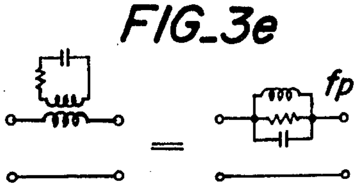
Figure 3F:
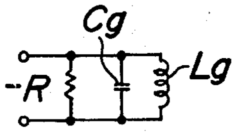

A conventional microwave frequency converting device has a construction as shown in FIG. 1. In the drawing, $I_n$ represents an input signal terminal to which an input signal having frequency $f_s$ is applied. The applied input signal passes a bandpass filter 1 having its pass band frequency $f_s$ and is applied to a mixer 2 made of a diode. On the other hand, 3 is a local oscillator which produces an oscillation having frequency $f_p$. The local oscillation wave passes a bandpass filter 4 having the pass band frequency $f_p$ and is applied to said mixer 2. From this mixer 2 an intermediate frequency signal having frequency $f_i$, which is expressed by a formula $|f_p - f_s| = f_i$, is obtained and the intermediate frequency signal passes through low-pass filter 5 and is taken out from an intermediate frequency output terminal IF.

As explained above a solid oscillator mounted on waveguide has usually been used as for the oscillator 3 for producing such local oscillation signal. For the bandpass filter 1, a filter having a shape of the waveguide is used and as for the mixer 2 a waveguide type or a printed circuit has been used.

In view of the fact that the conventional frequency converting device comprises various circuit elements mounted on the waveguide, the device becomes bulky and construction is complicated. Due to such construction, the overall cost of the conventional device had been substantially high.

One embodiment of a frequency converting device according to the present invention is shown in FIGS. 2 *a – h*. FIG. 2 *a* shows schematically a basic construction of the device. In FIG. 2 *a*, 6 generally indicates a waveguide which transmits a $TE_{01}^{\square}$ mode wave. The waveguide comprises two side surfaces and at the middle thereof and in parallel thereto a conductor plate 7 is inserted. This conductor plate 7 may be substituted by an insulation plate applied with conductive films on either or both surfaces. Hereinafter, in view of convenience of explanation, where a conductor plate is referred to, it includes such a case of a conductor film applied on an insulation plate. This conductor plate 7 is a base to form slots having various conductor patterns to form required circuit elements. Embodiments of such patterns are shown in FIGS. 2 *b* and *c*.

The conductor plate 7 may be made of a phosphor bronze plate or of a copper foil supported by a insulation base plate. The plate 7 is placed in the middle of two U-shaped waveguide portions 6 and 6' as clearly shown in FIG. 2 *d*. For the convenience of explanation surfaces of the insulation base plate 7 are termed "A" surface and "B" surface, respectively. The portion of a waveguide is also referred to as a trough guide.

In such construction of a waveguide portion or trough guide, the signalling wave having $TE_{01}^{\square}$ mode propagates in even mode in the cross-section of the waveguide with respect to the symmetrical plane in parallel with its E plane. In other words, the wave propagation mode in a cross-section normal to the propagating direction or to the longitudinal axis of the waveguide has symmetrical configuration with respect to the symmetrical plane. Accordingly, in such $TE_{01}^{\square}$ wave propagation mode, notwithstanding the construction in which the insulation plate is inserted between waveguide portions 6 and 6' there is no leakage of wave to outside of the waveguide 6 from the insulation plate. Besides a cutoff region of the waveguide as provided thereon by the insertion of the conductor plate 7 is parallel with its E-plane.

FIG. 2 *b* and FIG. 2 *c* show slot patterns on "A" surface and "B" surface, respectively, of the conductor film applied on an insulation base plate. It should be noted that the "B" surface pattern shown in FIG. 2 *c* is viewed from insulation base side. Further, it is assumed that the input signal is applied from left side of the drawings especially of FIGS. 2 *a*, *b*, *c*, *f* and *g*.

In FIG. 2 *c* the first bandpass filter $F_s$ is formed by providing window shaped openings on the metallic film which bandpass filter passes the input signal having frequency $f_s$ which is located at center frequency of the passing band thereof. An equivalent circuit thereof is shown in FIG. 3 *a*. A second bandpass filter $F_P$ is formed by providing a window shaped opening in the same manner with the bandpass filter $F_s$ and the second bandpass filter $F_P$ is used for passing the output of a pumping oscillator having frequency $f_p$. An equivalent circuit diagram thereof is shown in FIG. 3 *b*.

In FIG. 2 *b*, an antenna $A_1$ provided on the "A" surface is to receive an input signal having frequency $f_s$ which had passed said first bandpass filter $F_s$ and is further to receive a pumping signal having frequency $f_p$ which had passed the second bandpass filter $F_p$. Such an antenna $A_1$ may be formed by adhering a conductive strip line on the "A" surface on the insulation base. At one end of the antenna $A_1$ a diode S to be used as the mixer is connected. Furthermore, $F_i$ is a low-pass filter for passing the intermediate frequency signal being produced by mixing said input signal and the pumping signal by the diode S. An equivalent circuit for the above mentioned circuit which comprises the antenna $A_1$, diode S and the low-pass filter $F_i$ is shown in FIG. 3 *c*.

Then, as shown in FIG. 2 *c*, a resonating circit $F_g$ is formed by providing window shaped opening on the metal film provided on the "B" surface which resonating circuit forms a self-pumping circuit for the pumping oscillation. An equivalent circuit diagram of the above circuit is as shown in FIG. 3 *e*.

At one end of a solid oscillator G made of for instance a Gunn diode provided on the "A" surface, a strip line $A_2$ is connected. Said strip line $A_2$ is an element having an antenna function for radiating the output of the solid oscillator G. Supply of direct current voltage to the Gunn diode G may be effected via a choke for preventing passing of the oscillation component from an outside electric source. Detailed explanation of such current supplying circuit is omitted from the explanation and hence such details are not illustrated in the drawing.

In FIG. 2 *c*, a recess L provided on a conductor film on "B" surface is a transmission circuit of the pumping signal. At one end of the recess, a wedge shaped cutting "*a*" is provided toward the bandpass filter $F_p$ in order to obtain an easy coupling of the transmitted pumping signal with the second bandpass filter $F_p$. An equivalent circuit diagram of these portions is illustrated in FIG. 3 *f*.

Beside the above explained component as shown in the FIGS. 2 *b* and *c*, strip lines $l_1$, $l_2$, $l_3$, $l_4$, $l_5$ are provided at the portion for making contact with the two U-shaped waveguide portions at both sides of the insulation base.

Lower strip line on the "A" surface is divided into two portions $l_2$ and $l_3$ extending between points R and S and between points P and Q, respectively. These portions are insulated from the low-pass filter $F_i$ with respect to direct current. The low-pass filter $F_i$ is coupled with strip lines $l_2$ and $l_3$ with respect to high frequency component via capacitive component thereof. Accordingly, this portion may be assumed as being a continuous strip line for the strip line portions $l_2$ and $l_3$ with respect to the input signal and the pumping signal and is assumed with respect to that intermediate frequency signal to be a coaxial line having outer conductor formed by the portion between Q and R and an inner conductor formed by one end of the low-pass filter $F_i$ and via the coaxial line said intermediate frequency signal is derived out and is utilized from intermediate frequency output terminal IF.

FIG. 2 *f* shows a condition in which the strip lines $l_1$ and $l_4$ are connected to U-shaped waveguide portions from both sides of an insulating base, and FIG. 2 *g* shows a condition of coupling of waveguide with strip lines $l_2$, $l_3$, $l_5$. At this portion said coaxial line for deriving out an intermediate frequency signal as explained above is formed.

FIG. 2 *d* and FIG. 2 *e* are cross-section of the waveguide according to the present invention viewed from end of the waveguide axis at portion between P and Q or between R and S and portion between Q and R, respectively.

Figure 4:
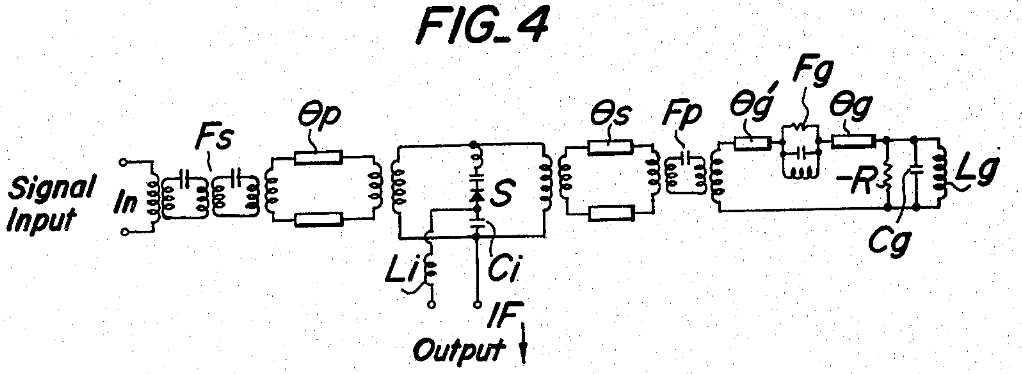
FIG. 4 represents an equivalent circuit diagram for the overall construction of the frequency converting device of the present invention.

An equivalent circuit for the overall construction is shown in FIG. 4. From this equivalent circuit it may be clear that the input signal having frequency $f_s$ and a pumping signal having frequency $f_p$ is mixed at the diode S and an intermediate frequency signal having frequency $f_i$ $(=|f_p - f_s|)$ is formed and is derived from an intermediate frequency output terminal IF.

In FIG. 4, $\theta_p$ and $\theta_s$ represent lengths of the transmission lines at the pumping signal side and input signal side, respectively. As for the pumping signal side, as the filter $F_p$ is short-circuited, by selecting the lengths $\theta_p$ and $\theta_s$ to be $\lambda_p/4$ and $\lambda_s$, respectively ($\lambda_p$: a wavelength of the pumping signal, $\lambda_s$: wavelength of an inpupt signal), it is possible to make the input signal and the pumping signal being effectively concentrate in the diode S. As for the length $\theta_g$ it should be so selected that the length of the line corresponds to phase O or $\pi$ radius so as to obtain a stable self-pumping function by feeding back a part of output of the local oscillator by reflection in the resonating circuit to the local oscillator G.

$\theta_g'$ corresponds to the wedge shaped cutting "*a*" provided at the pumping signal transmission line L shown in FIG. 2 *c*, which had been provided for making an easy introduction of the pumping signal into the diode S.

As the frequency converting device according to the present invention has its construction as mentioned above, only the input signal having frequency component $f_s$ passes the first bandpass filter $F_s$ and the power thereof is used to excite the antenna $A_1$ and is fed to a diode S connected at one end thereof. The produced pumping signal in the pumping oscillator G is radiated from an antenna $A_2$ then transmitted to a conductor in the "B" surface coupled to the antenna $A_2$ and fed to bandpass filter $F_p$ via a transmission line L. In this case, a part of the oscillatory wave is fed back by a self-pumping circuit $F_g$ and fed to the oscillator G so as to stabilize the oscillating frequency. Out of the pumping signal fed to the bandpass filter $F_p$ only the pumping signal component having frequency $f_p$ passes the filter and excites the antenna $A_1$ and then fed to the diode S.

In the diode S, the input signal and the pumping signal are mixed and an intermediate frequency signal having frequency $f_i$ $(=|f_p-f_s|)$ is produced. The intermediate frequency signal having frequency $f_i$ is derived from the output terminal IF via a low-pass filter $F_i$.

The diode G for pumping oscillation provided on the "A" surface shown in FIG. 2 *b* may be provided on the "B" surface as shown by a dotted line in FIG. 2 *c* at a location $g'$ in the transmission circuit L. In this case, by setting the length between one end L' of the transmission circuit L and the point $g'$ to be $\lambda/4$, the impedance viewed from the position $g'$ to the end of L' becomes infinitive so that the oscillatory wave efficiently propagates towards the bandpass filter $F_p$.

In the aforementioned example, if the strip line $l_5$ is also divided into two portions and if the circuit portion formed by antenna $A_1$, diode S and the low-pass filter $F_i$ which had been provided on the "A" surface as shown in FIG. 2 *b* is provided on the "B" surface, then, all the circuits may be provided on one surface only so that the manufacturing process may be very simplified.

In the previous explanation, in order to simplifying the explanation of the circuit construction, the conductor pattern had been provided on an insulation base having an object for increasing mechanical strength. By introducing a construction to provide all the elements on one surface as mentioned above and by using a metal plate such as phosphor bronze plate for replacing the conductor film of such one surface, a sufficient strength may be obtained even by using a plate having a thickness of about 0.3 mm. Accordingly, in this case, the slot pattern may be formed by press working in the metal plate without using an insulating base. One example of conductive pattern made in this manner is shown in FIG. 6.

Figure 6:
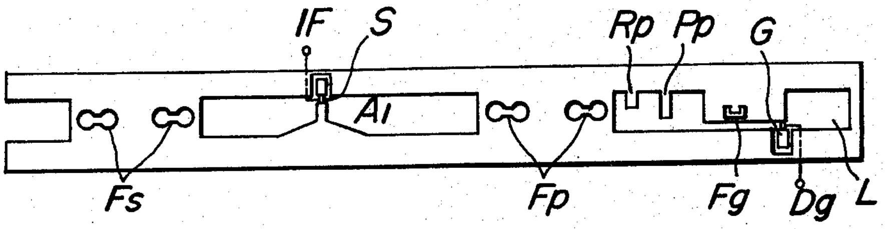
FIG. 6 is a view for explaining one practical embodiment of the base plate of the device of the present invention.

FIG. 6 illustrates an embodiment wherein the slot patterns having function of the frequency converting device are provided on one conductor plate. In FIG. 6, the reference characters such as $F_s$, $A_1$, S, IF, $F_p$, $F_g$, G, L represent corresponding elements as has been illustrated in FIG. 2. In FIG. 6, $R_p$ illustrates a resistive film for adjusting pump output and $P_p$ is a matching conductor of the pump output circuit. Further, $D_g$ is a direct current (DC) source terminal for the oscillating semiconductor.

In this case, DC voltage supply to the Gunn diode G may be effected by means of a strip line $A_2'$, for instance, as shown in FIG. 2 *h* by providing conducting groove in the upper conductor plate forming transmission line L and providing said strip line $A_2'$ at a center portion thereof via an interposition of an insulating plate.

In this case, a $\lambda/4$ trap is provided in the transmission groove at a location aparting a length corresponding to $\lambda/4$ from the oscillator so as to assure conduction between the strip line $A_2'$ and the surrounding conducting plate with respect to the oscillating wave if viewed from position of diode G and to provide an insulation with respect to a DC voltage therebetween.

A further embodiment for improving conversion efficiency of the frequency converting device according to the present invention by making the circuit impedances viewed from both ends of the mixer diode with respect to an image frequency $f_m$ $(=2f_p-f_s)$ as reactive load will be explained.

Figure 7A:
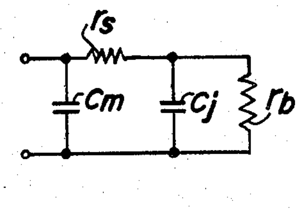
FIGS. 7 *a*, *b* and *c* are equivalent circuit diagrams for explaining the function of a modified embodiment.
Figure 7B:
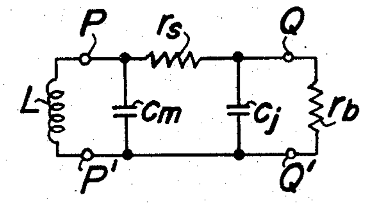
Figure 7C:
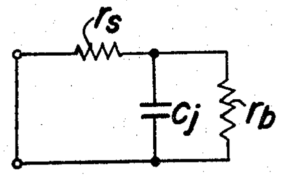

An equivalent circuit diagram of a diode to be used as a mixer is shown in FIG. 7 *a*. In this figure, $C_j$ represents barrier capacitance of a Schottky barrier diode. The barrier capacitance $C_j$ is shunt connected by a resistance $r_b$ based on the applied voltage and conducting current thereto. In series with the parallel circuit of $C_j$ and $r_b$, a series resistance $r_s$ is connected which resistance representing resistance value including dissipation resistance. Further a capacitance $C_m$ of diode mount is connected in paralllel thereto. To make the terminal impedance of the diode being equivalent to an open impedance at an image frequency $f_m$, it is considered to connect an inductance L between two terminals P and P' as shown in FIG. 7 *b*, and to select the values $C_j+C_m$ and L to resonate with the image frequency $f_m$. If we assume the resistance component $r_s=0$, the impedance viewed from terminals Q and Q' to the inductance side or P and P' side may become infinitive. However, in practice as the resistance $r_s \neq 0$, so that the above impedance becomes a definite resistance value and the conversion loss becomes larger if compared with the case of $r_s=0$. Accordingly, the conversion loss becomes smaller by short-circuiting the terminals P and P' as shown in FIG. 7 *c*. In practice, by short-circuiting the terminals P and P' as shown in FIG. 7 *c* the conversion loss decreases by about 1.5 dB.

Figure 8:
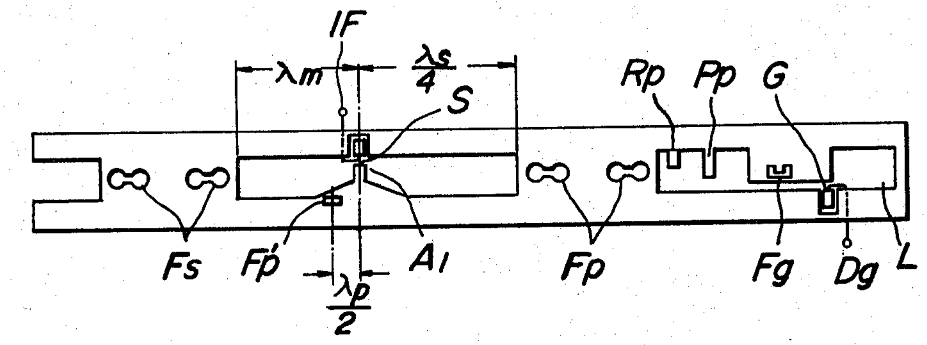
FIG. 8 is plan view of the modified embodiment of the base plate pattern.

In order to obtain a circuit construction for a frequency converting device according to the present invention, a conductor pattern as illustrated in FIG. 8 may be used. In FIG. 8, identical portions with those shown in FIG. 6 are indicated by same reference numerals. In FIG. 8, $\lambda_m$ represents image signal wavelength in the waveguide having frequency $f_m$, $\lambda_p$ represents pumping signal wavelength having frequency $f_p$ and $\lambda_s$ represents input signal wavelength having frequency $f_s$.

In the illustrated conductor pattern, by providing a slot resonator $F_p'$ for resonating pumping signal $f_p$ at a distance $\lambda_p/2$ appart from a strip line antenna $A_1$ connected to a diode S and at the side of incoming signal being propagated from bandpass filter $F_s$, the pumping signal power which had passed through the bandpass filter $F_p$ is efficiently applied to the mixer diode S through the antenna $A_1$. On the other hand with respect to the image frequency $f_m$, by selecting the distance between the antenna $A_1$ and right end of the bandpass filter $F_s'$ to be equal to the wavelength $\lambda_m$ of the image frequency signal inside the waveguide, the impedance viewed from the diode S toward the incoming signal side becomes short-circuited at the image frequency $f_m$. Accordingly, by introducing above mentioned relationship of the conductor pattern, the equivalent circuit shown in FIG. 7 *c* can be realized. In practice, by using such conductor pattern, a frequency converting device having its conversion loss about 2.0–2.5 dB can be realized according to the present invention.

Hereinafter, a means for preventing variation of oscillating frequency of the frequency converting device according to the present invention due to variation of temperature or moisture will be explained.

Figure 5A:
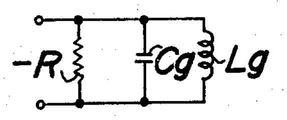
FIGS. 5 *a* and *b* are more simplified circuit diagrams for explaining the frequency converter of the present invention.
Figure 5B:
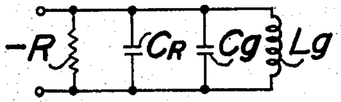

For instance, if a Gunn diode or silicon PN type IMPATT diode is used, the operating frequency becomes lower according to the temperature rise. FIG. 5 *a* shows an equivalent circuit thereof and the above variation corresponds to a variation of resonating frequency of an inductance $L_g$ and capacitance $C_g$ can be compensated by oppositely providing a rutile plate with an interposition of an insulating plate which decreases its dielectric constant according to rising of temperature. The equivalent capacitance caused by such a rutile plate is selected to correspond to capacitance $C_R$ connected in parallel with the capacitance $C_g$ so as to make the value of resultant capacitance of capacitances $C_g$ and $C_R$ becomes small according to the temperature rise (by making $C_R$ to become smaller). Then, the decrease of frequency according to increase of temperature may be compensated by an increase of $L_g$ as substantially explained above.

According to further aspect of the present invention, the oscillating frequency can be made more stable by using such temperature compensation and self-pumping of the oscillating circuit $F_g$.

Variation of oscillation resonating frequency of the resonating circuit $F_g$ can be made at an order of $10^{-8}$/°C for instance, by using silicon dioxide $SiO_2$ for the above mentioned insulating plate so that the variation can be made much less due to temperature variation if compared with an order of $10^{-6}$/°C in case of using conventional cavity resonator. In the conventional case by using such cavity resonator, the resonant frequency had been varied due to temperature variation. But according to the present invention, the portion of resonating circuit $F_g$ may additionally be covered by a separate $SiO_2$ film by which means such influence of the temperature variation can be made smaller due to weakening of the electric field in the air caused the circuit $F_g$.

$Q_o$ of the Q value at no load condition of the resonator $F_g$ on the insulation plate is about on the order of 1,500 which is one order of magnitude less if compared with a cavity resonator ($Q_o$ of a cavity resonator is about 15,000). Accordingly, if $Q_g$, which is an outer Q of an oscillator is identical, the improvement by self-pumping is considered one order less. However, $Q_g$ of an oscillator of the present invention can be made one order less with respect to the $Q_g$ of a conventional waveguide oscillator (about 100). As a result, a sufficient improvement over the prior art can be obtained.

Namely, the degree of improvement is in proportion to a value $Q_o/Q_g$, according to the present invention, $Q_g$ can be made less than 10 so that if using a resonating circuit of $Q_o$=1,500, the frequency deviation can be made about 1/20.

As a still further embodiment of the present invention, a step-recovery diode may be connected in lieu of the pumping oscillator G in the conductor pattern as shown in FIG. 6 and to apply an output of a quartz oscillator provided outside. For example, an output of a quartz oscillator of 100 MHz is four times multiplied so as to obtain a high frequency signal of 400 MHz and about 150 mW. Then the output is applied to the step-recovery diode provided in lieu of the oscillator G shown in FIG. 6, a high frequency output signal in 12 GHz band and having a power of about 5 mW can be obtained. By using such practice, a current of about 3 mA may be passed to a Schottky diode of the mixer and a stabilization of local oscillation can be obtained. In case of using the step-recovery diode in lieu of the solid oscillator G, the resonating circuit $F_g$ for self-pumping can be dispensed with.

As has been explained in the foregoing, all the circuit elements can be provided on one conductor plate, which is sandwiched by two U-shaped waveguide portions, a very simply assembled and low cost frequency converting device can be realized.

Further with respect to temperature variation the degree of frequency stabilization by means of self-pumping is much better than cavity resonator. Moreover, the degree of frequency stabilization according to the temperature variation is much better compared with a conventional cavity resonator.

What is claimed is:

1. A planar frequency converting device mounted in a waveguide, having a transmission wave mode in a cross-section of the waveguide normal to its longitudinal axis that is an even mode with respect to its symmetrical plane extending along the axis and in parallel with its shorter side edges, comprising a single conductor plate extending in the symmetrical plane so as to divide inner space of the waveguide into two separate regions, said conductor plate being provided thereon with a plurality of slots forming a unitary conductor pattern composing respective planar circuit elements, including:

- a first slot type band-pass-filter for passing an input signal,
- a second slot type band-pass-filter for passing a pumping signal,
- a first slot line for transmitting said input signal after said input signal has passed the first band-pass-filter and for preventing transmission of the pumping signal,
- a second slot line for transmitting said pumping signal after said pumping signal has passed said second band-pass-filter and for preventing transmission of said input signal,
- slot circuits composing a pumping oscillator for producing said pumping signal,
- a strip element formed between the first and second slot lines and functioning as an antenna for receiving said input signal and said pumping signal,
- said single conductor plate being further provided with a non-linear element for forming a mixer supplied by said antenna with said input and pumping signals, an oscillating element for forming said pumping oscillator, and a strip element forming a low-pass-filter for passing the mixed output of said mixer, mounted in spaces of said conductor pattern, respectively.

2. A planar frequency converting device as claimed in claim 1, wherein said single conductor plate has a conductor film applied on one surface of an insulating base plate.

3. A frequency converting device as claimed in claim 1, wherein said conductor plate is sandwiched between two U-shaped waveguide portions.

4. A frequency converting device as claimed in claim 1, wherein said slot circuits composing said pumping oscillator include a slot resonating circuit for forming a self-pumping circuit.

5. A frequency converting device as claimed in claim 1 wherein the length of said first slot line for transmitting said input signal is made equal to a wavelength of the image frequency of said input signal in said waveguide, and wherein said frequency converting device is further provided thereon with a slot resonating circuit for resonating to the frequency of said pumping signal at a location one-half wavelength of said pumping signal in the waveguide from the position of said non-linear element.

6. A frequency converting device as claimed in claim 1, wherein the length of said second slot line for transmitting said pumping signal is made equal to one-fourth of wavelength of said input signal in the waveguide.

7. The frequency converting device of claim 3 wherein said conductor plate has a conductor film applied to a surface of an insulating base plate.

8. The frequency converting device of claim 3 wherein said conductor plate is a metal plate.

9. A planar frequency converting device mounted in a rectangular waveguide that has a wave transmission mode in a cross-section of the waveguide normal to its longitudinal axis which is an even mode with respect to its symmetrical plane which extends along said longitudinal axis and which is parallel with the shorter sides of said waveguide, said device comprising:

a single conductor plate having a planar surface disposed parallel to said symmetrical plane which is sandwiched between two U-shaped sections of said waveguide so as to divide the inner space of the waveguide into first and second separate regions, said plate having an insulation base with a unitary conductive pattern disposed on said base and which has a plurality of strip lines on said base for making contact with said two U-shaped sections at both sides of said base, said unitary conductive pattern having formed thereon a plurality of planar circuit element including:

a first slot type band-pass-filter for passing an input signal, a second slot type band-pass-filter for passing a pumping signal, a first slot line for transmitting said input signal after passing the first band-pass-filter and for preventing transmission of the pumping signal, a second slot line for transmitting said pumping signal after passing said second band-pass-filter and for preventing transmission of said input signal, slot circuits for forming a pumping oscillator for producing said pumping signal, a first strip element formed between the first and second slot lines and functioning as an antenna for receiving said input signal and said pumping signal, a non-linear element for forming a mixer supplied with said input and pumping signals by said antenna, an oscillator element for forming said pumping oscillator, a third strip element forming a low-pass-filter for passing the intermediate frequency signal that is the mixed output of said mixer, said non-linear element, oscillating elements and said third strip elements being mounted in spaces of said conductor pattern respectively.

10. The frequency converting device of claim 9 wherein:

one of said strip lines is divided into two separate portions to define a space between said separate portions and wherein said third strip element forming a low-pass-filter has a portion thereof disposed in said space but not in contact with said separate portions so that said portion of said low-pass-filter and said two separate portions are insulated from each other with respect to direct current, are capacitively coupled with respect to said pumping signal and said input signal, and form a coaxial line with respect to said intermediate frequency signal which has said separate portions as an outer conductor and said second strip element as an inner conductor for obtaining the intermediate frequency signal as an output of said frequency converting device.

11. A planar frequency device according to claim 10, wherein said conductive pattern is disposed on first and second opposed sides of said base which sides face said first and second regions respectively and wherein said first and second slot-type band-pass-filters and said slot circuits for forming a pumping oscillator are formed on said conductive pattern on said first side of said base and said first strip element, said non-linear element forming said mixer, said second strip element and said third strip elements are formed on said second side of said base.

12. The apparatus of claim 11 wherein said oscillating element is disposed on said first side of said base.

13. The apparatus of claim 11 wherein said oscillating element is disposed on said second side of said base.

14. The apparatus of claim 11 wherein said slot circuits for forming said pumping oscillator comprises a conductive film layer disposed on said base having a rectangular recess therein, both said film and said recess being in contact with said second slot type band-pass-filter, said recess forming a transmission circuit for transmitting said pumping signal to said second slot type band-pass-filter and having a wedge shaped cutting provided toward said second band-pass-filter to facilitate coupling of said pumping signal with said second band-pass-filter.

* * * * *